United States Patent
Kim

(10) Patent No.: US 7,120,135 B2
(45) Date of Patent: Oct. 10, 2006

(54) WIRE/WIRELESS UNIFIED IN-BUILDING COMMUNICATION METHOD AND SYSTEM

(75) Inventor: Ki-Chul Kim, Suwon-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 947 days.

(21) Appl. No.: 09/828,126

(22) Filed: Apr. 9, 2001

(65) Prior Publication Data

US 2001/0046215 A1    Nov. 29, 2001

(30) Foreign Application Priority Data

May 24, 2000    (KR)    ............... 2000-28087

(51) Int. Cl.
*H04Q 7/00*    (2006.01)
*H04L 12/54*    (2006.01)

(52) U.S. Cl. ............... 370/329; 370/338; 370/395.1; 370/401; 455/432.3

(58) Field of Classification Search ............... 370/328, 370/329, 331, 332, 333, 343, 338, 352, 353, 370/354, 355, 356, 401, 395.1; 455/422.1, 455/435.1, 445, 446, 448, 449, 432.1, 432.2, 455/432.3, 435.2, 435.3, 436
See application file for complete search history.

(56) References Cited

U.S. PATENT DOCUMENTS

| | | | |
|---|---|---|---|
| 5,090,051 A | 2/1992 | Muppidi et al. | |
| 5,303,287 A | 4/1994 | Laborde | |
| 5,475,681 A | 12/1995 | White et al. | |
| 5,506,887 A | 4/1996 | Emery et al. | |
| 5,537,610 A | 7/1996 | Mauger et al. | |
| 5,544,226 A | 8/1996 | Weis et al. | |
| 5,715,296 A | 2/1998 | Schornack et al. | |
| 5,722,076 A | 2/1998 | Sakabe et al. | |
| 5,734,699 A | 3/1998 | Lu et al. | |
| 5,818,824 A | 10/1998 | Lu et al. | |
| 5,873,033 A | 2/1999 | Hjern et al. | |
| 5,875,186 A * | 2/1999 | Belanger et al. | ............ 370/331 |
| 5,890,064 A | 3/1999 | Widergen et al. | |
| 5,898,931 A | 4/1999 | I'Anson et al. | |
| 5,953,651 A | 9/1999 | Lu et al. | |
| 5,995,828 A * | 11/1999 | Nishida | ...................... 455/417 |
| 5,995,843 A | 11/1999 | Sjödin et al. | |
| 6,049,593 A | 4/2000 | Acampora | |

(Continued)

*Primary Examiner*—Afsar Qureshi
(74) *Attorney, Agent, or Firm*—Robert E. Bushnell, Esq.

(57) ABSTRACT

A unified in-building communication method in a communication system connected to a public land mobile network (PLMN), a public switched telephone network/integrated services digital network (PSTN/ISDN), and an Internet protocol (IP) network is disclosed. The method comprises setting a common cell area such that a wireless public or wireless in-company communication service is available in a prescribed local area; and connecting a mobile switching center (MSC) to the PLMN, using a registered mobile terminal as an extension telephone in the common cell area, and bypassing an unregistered mobile terminal, so that the PLMN can share a base station. The registered mobile terminal communicates with a wire extension terminal or a wireless extension terminal, and the registered mobile terminal wirelessly receives a data service through the IP network. The wireless in-building communication service of the present invention is performed in a single cell so that a handoff does not occur. The wireless in-building communication service of the present invention is performed such that, even for the same service provider, when the registered mobile terminal moves out of the common cell and moves into the PLMN and vice versa, the handoff does not occur.

15 Claims, 4 Drawing Sheets

U.S. PATENT DOCUMENTS

| | | |
|---|---|---|
| 6,073,018 A | 6/2000 | Sallberg |
| 6,073,029 A | 6/2000 | Smith et al. |
| 6,097,966 A | 8/2000 | Hanley |
| 6,400,949 B1 * | 6/2002 | Bielefeld et al. ........... 455/434 |
| 6,466,964 B1 * | 10/2002 | Leung et al. ............... 709/202 |
| 6,600,924 B1 * | 7/2003 | Sinivaara et al. ........... 455/444 |
| 6,729,929 B1 * | 5/2004 | Sayers et al. ................ 455/446 |
| 6,885,668 B1 * | 4/2005 | Lee et al. ................ 370/395.1 |
| 2001/0011019 A1 * | 8/2001 | Jokimies ...................... 455/449 |

* cited by examiner

WIRE/WIRELESS UNIFIED IN-BUILDING COMMUNICATION METHOD AND SYSTEM

CLAIM OF PRIORITY

This application claims priority to an application entitled "Wire/Wireless Unified In-Building Communication Method and System" filed in the Korean Industrial Property Office on May 24, 2000 and assigned Serial No. 2000-28087, the contents of which are hereby incorporated by reference.

BACKGROUND OF THE INVENTION

1. Technical Field

The present invention relates generally to a unified communication system, and in particular, to a system which can provide both wire and wireless unified in-building communication services, and method of providing both wire and wireless unified in-building communication services.

2. Related Art

The invention premises that a communication service area is limited to one building or a prescribed local area.

A wire in-building communication system can use a private branch exchange (PBX) or a keyphone system for a voice service, and can use a local area network (LAN) switch and a router, associated with a server, for a data service. In a wireless in-building communication technology, there can be introduced a cordless telephone-second generation (CT-2) technology and a European global system for mobile (GSM) communication technology.

Exemplars of recent efforts in the communications arts include U.S. Pat. No. 5,537,610 to Mauger et al., entitled MOBILE COMMUNICATION HAVING MOBILE SUBSCRIBERS, PCN NETWORK, PBX AND A LOCAL EXCHANGE, issued on Jul. 16, 1996, U.S. Pat. No. 5,303,287 to Laborde, entitled INTEGRATED PERSONAL/CELLULAR COMMUNICATIONS SYSTEM ARCHITECTURE, issued on Apr. 12, 1994, U.S. Pat. No. 6,073,029 to Smith et al., entitled METHOD AND SYSTEM FOR PROVIDING WIRELESS COMMUNICATIONS TO A SUBSCRIBER OF A PRIVATE WIRELINE NETWORK, issued on Jun. 6, 2000, U.S. Pat. No. 6,097,966 to Hanley, entitled WIRELESS ACCESS FOR LOCAL EXCHANGE CARRIERS, issued on Aug. 1, 2000, U.S. Pat. No. 6,073,018 to Sallberg, entitled SYSTEM AND METHOD FOR INTERWORKING OF WIRELESS COMMUNICATION SYSTEMS WITH ISDN NETWORKS, issued on Jun. 6, 2000, U.S. Pat. No. 5,506,887 to Emery et al., entitled PERSONAL COMMUNICATIONS SERVICE USING WIRELINE/WIRELESS INTEGRATION, issued on Apr. 9, 1996, U.S. Pat. No. 5,715,296 to Schornack et al., entitled CONCURRENT WIRELESS/LANDLINE INTERFACE APPARATUS, issued on Feb. 3, 1998, U.S. Pat. No. 5,475,681 to White et al., entitled WIRELESS IN-BUILDING TELECOMMUNICATIONS SYSTEM FOR VOICE AND DATA COMMUNICATIONS, issued on Dec. 12, 1995, U.S. Pat. No. 6,049,593 to Acampora, entitled HYBRID UNIVERSAL BROADBAND TELECOMMUNICATIONS USING SMALL RADIO CELLS INTERCONNECTED BY FREE-SPAZE OPTICAL LINKS, issued on Apr. 11, 2000, U.S. Pat. No. 5,544,226 to Weis et al., entitled PRIVATE BRANCH EXCHANGE HAVING A CENTRAL CONTROL UNIT AND A MOBILE CONTROL UNIT SUBORDINATE THERETO, issued on Aug. 6, 1996, U.S. Pat. No. 5,722,076 to Sakabe et al., entitled INTRA-PREMISES COMMUNICATION SYSTEM, issued on Feb. 24, 1998, U.S. Pat. No. 5,734,699 to Lu et al., entitled CELLULAR PRIVATE BRANCH EXCHANGES, issued on Mar. 31, 1998, U.S. Pat. No. 5,890,064 to Widergen et al., entitled MOBILE TELECOMMUNICATIONS NETWORK HAVING INTEGRATED WIRELESS OFFICE SYSTEM, issued on Mar. 30, 1999, U.S. Pat. No. 5,818,824 to Lu et al., entitled PRIVATE MULTIPLEXING CELLULAR NETWORK, issued on Oct. 6, 1998, U.S. Pat. No. 5,953,651 to Lu et al., entitled CELLULAR ADJUNCT TO A PUBLIC WIRED NETWORK, issued on Sep. 14, 1999, U.S. Pat. No. 5,995,843 to Sjödin et al., entitled METHOD AND ARRANGEMENT FOR USING A MOBILE PHONE INA WIRELESS OFFICE NETWORK, issued on Nov. 30, 1999, U.S. Pat. No. 5,090,051 to Muppidi et al., entitled RADIO COMMUNICATION SYSTEM AND METHOD FOR CONNECTING AN INCOMING CALL TO A WIRELESS TELEPHONE, issued on Feb. 18, 1992, U.S. Pat. No. 5,873,033 to Hjern et al., entitled METHOD AND ARRANGEMENT FOR TRANSFER BETWEEN A CORDLESS TELECOMMUNICATION SYSTEM AND A CELLULAR MOBILE TELECOMMUNICATION SYSTEM, issued on Feb. 16, 1999, and U.S. Pat. No. 5,898,931 to I'Anson et al., entitled BASE STATION FOR A TELECOMMUNICATIONS SYSTEM, issued on Apr. 27, 1999.

In particular, the U.S. Pat. No. 5,090,051 discloses a CT-2 phone, which is used as a cordless telephone at home and performs wireless communication for local and international calls through a CT-2 repeater without a handoff. A digital electronic cordless telephone (DECT) communication system, which is a European cordless telephone system, and a cellular GSM communication system, disclosed in U.S. Pat. Nos. 5,898,931 and 5,873,033, are connected to the public switched telephone network (PSTN) and provide a communication service to a wireless terminal through a private automatic branch exchange (PABX). These systems are operated and controlled separately from the PABX for the wire in-building communication service and a wireless system for the wireless communication service on the wireless terminal.

Therefore, there has been a demand for a method and system enabling the unified communication service for the wire and wireless in-building data communication and the Internet communication.

SUMMARY OF THE INVENTION

It is, therefore, an object of the present invention to provide a unified in-building communication method and system for providing an in-building wireless communication service in a limited local area using a code division multiple access (CDMA) technique and providing various data communication services using the existing wire and Internet protocol (IP) terminals.

It is another object of the present invention to provide a unified in-building communication method and system for providing an economic and reliable unified communication service by combining a CDMA system with voice-over-Internet protocol (VoIP) and gate keeper and commonly using a mobile switching center (MSC) for controlling wire and wireless in-building switching in a private branch exchange (PBX).

It is further another object of the present invention to provide a unified in-building communication system for providing a wireless in-building communication service in a single-cell concept, thereby enabling the subscribers to use the service free of charge.

To achieve the above and other objects, a unified in-building communication system includes an Internet protocol-private branch exchange (IP-PBX), a private base station controller (pBSC), a private base transceiver subsystem (pBTS), a call manager, a router, a local area network (LAN) switch, and a public land mobile network (PLMN).

The IP-PBX generates a switching control command signal according to an in-building PBX mobile switching call of the mobile terminals, which is set under the control of the call manager connected to the LAN cable, and performs switching according to the generated switching control command signal. Further, the IP-PBX enables an in-building (or extension) call and an incoming/outgoing call through the public switched telephone network/integrated services digital network (PSTN/ISDN), a subscriber line interface (SLI) and a digital line interface (DLI) connected respectively to a wire telephone and a digital telephone for the existing voice communication. In addition, the IP-PBX manages data using maintenance and administration program (MAP), performs message communication on a call message using an information link message, and provides a service between IP terminals with the gateway and gate keeper function using a VoIP by an ITU-T recommendation H.323 interface through the local area network (LAN) cable. The ITU is the International Telecommunications Union, and the ITU-T is the arm of the International Telecommunications Union responsible for telecommunications standards.

The pBSC connected to the IP-PBX and a global positioning system (GPS) antenna (GANT), provides a complete path to a mobile subscriber by allocating a vocoder in response to an outgoing call request originated from the mobile terminal, processes an incoming call by allocating a vocoder in response to an incoming call request, processes a test call at the operator's request, and processes a circuit mode data call for G3 facsimile modem and a packet mode data call for Internet service in addition to the voice call. The G3 facsimile modem is a fax connected to a general telephone line. The G3 facsimile modem is a part of a terminal.

The private base transceiver subsystem (pBTS) is connected to the private base station controller (pBSC) and divided into a main BTS unit (pMU) and a radio BTS unit (pRU). The pMU performs a high-speed data service in accordance with TIA/EIA/IS-95-B air inter-frequency specification relating to mobile station-base station compatibility standard for dual-mode wideband spread spectrum cellular system. The term TIA represents Telecommunications Industry Association, the term EIA represents Electronics Industries Association, and the term IS represents interim standard. The pMU also performs various handoff power-up functions (PUF), performs closed-loop power control on a reverse link, performs priority access channel designation, performs call processing control on a service in association with a CDMA V.2 system, performs operation control for supporting the call processing control function, and performs maintenance, such as state management, test and alert, of the CDMA V.2 system. The pRU connected to the pMU, is connected to repeaters and with the antennas, performs up-conversion on a transmission signal and down-conversion on a receiving signal, and amplifies power of the transmission signal. The "CDMA V.2 system" means a system in a step of the IS-95B prior to being converted into the IS-95C.

The call manager controls the wireless call, performs operation and maintenance on the radio resource, performs PGM and program loaded data (PLD) loading function of a processor for controlling the pBSC resource, controls the wire/wireless unified communication service, supports a wireless in-company short message service (SMS) service, performs visitor location register (VLR) management on a mobile terminal roaming function among an SMS web server, the IP-PBX and the pBSC, and performs registration and function setup on the in-building mobile subscribers. The term "PGM" is an abbreviation for program. This program means a program of a processor with which a call manager controls a wireless call and controls a resource of pBSC and a program for managing a loading function of a PLD.

The router connected to the IP network through the E1 line, transmits and receives data at a transfer rate which is a multiple of the T1 or E1-class rate, and accesses a wireless network with the pBSC and an IP-based data network under the control of a telephone network of a circuit switching network with the IP-PBX and the call manager. E1 is a European standard for digital transmission which carries signals at 2.048 megabits per second (Mbps). T1 is a North American standard for digital transmission which carries signals at 1.544 Mbps.

The local area network (LAN) switch is connected to the IP-PBX, the pBSC and the call manager through the router, performs a backbone function for switching data in the system and performs a backbone function for allowing the system users to connect with the LAN.

The PLMN includes the public mobile switching center (MSC), base station controller (BSC), base transceiver subsystem (BTS), and inter-working function (IWF) connected to the IP network and the private base station controller (pBSC).

In accordance with one aspect of the present invention, there is provided a unified in-building communication method in a communication system connected to a PLMN, a PSTN/ISDN, and an IP network. The method comprises setting a common cell area such that a wireless public or wireless in-company communication service is available in a prescribed local area; and connecting a MSC to the PLMN, using a registered mobile terminal as an extension telephone in the common cell area, and bypassing a unregistered mobile terminal, so that the PLMN can share a base station. The unregistered mobile terminal is a terminal that is not registered with the in-building system. In case the unregistered mobile terminal requests a call in-building, the in-building system connects the call to a public switched telephone network.

The registered mobile terminal communicates with a wire extension terminal or a wireless extension terminal, and the registered mobile terminal wirelessly receives a data service through the IP network.

The wireless in-building communication service is performed in a single cell so that a handoff does not occur, and even for the same service provider, when the registered mobile terminal moves out of the common cell and movies into the PLMN and vice versa, the handoff does not occur.

To achieve these and other objects in accordance with the principles of the present invention, as embodied and broadly described, the present invention provides a unified in-building communication method in a communication system connected to a public land mobile network, a public switched telephone network/integrated services digital network, and an Internet protocol network, said method comprising the steps of: forming a common cell area in which a wireless public communication service and a wireless in-building communication service are available in a prescribed local area; connecting a mobile switching center to said public land mobile network; providing communications functions to a registered mobile terminal when said registered mobile terminal is located in said common cell area; and not providing said communications functions to an unregistered mobile terminal, and bypassing said unregistered mobile terminal.

To achieve these and other objects in accordance with the principles of the present invention, as embodied and broadly described, the present invention provides a unified in-building communication apparatus connected to a public land mobile network, a public switched telephone network/integrated services digital network, and an Internet protocol network, said apparatus comprising: at least one in-building repeater forming a public/private common cell in which said public land mobile network and an in-building private wireless network are commonly used; a call manager controlling a wireless call of a registered extension mobile terminal of said in-building private wireless network, controlling operation and maintenance of radio resources, controlling private base station controller resources, and controlling registration and function setup of extension mobile subscriber corresponding to said extension mobile terminal; and a public/private communication service unit being connected to said public land mobile network, said public switched telephone network/integrated services digital network, and said Internet protocol network, said public/private communication service unit performing an incoming/outgoing call from and to an office line and an extension call through an in-building private branch exchange, performing wireless communication of a registered mobile terminal in a base station under control of said call manager, and performing communication of an Internet protocol terminal.

To achieve these and other objects in accordance with the principles of the present invention, as embodied and broadly described, the present invention provides an apparatus, comprising: at least one in-building repeater forming a public/private common cell in which a public land mobile network and an in-building private wireless network are operating and available; a call manager controlling a wireless call of a registered extension mobile terminal of said in-building private wireless network, controlling operation and maintenance of radio resources, controlling private base station controller resources, and controlling registration and function setup of extension mobile subscriber corresponding to said extension mobile terminal; and a public/private communication service unit being connected to said public land mobile network, a public switched telephone network/ integrated services digital network, and an Internet protocol network, said public/private communication service unit performing an incoming/outgoing call from and to an office line and an extension call through an in-building private branch exchange, performing wireless communication of a registered mobile terminal in a base station under control of said call manager, and performing communication of an Internet protocol terminal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A preferred embodiment of the present invention will be described herein below with reference to the accompanying drawings. In the following description, well-known functions or constructions are not described in detail since they would obscure the invention in unnecessary detail.

Figure 1:
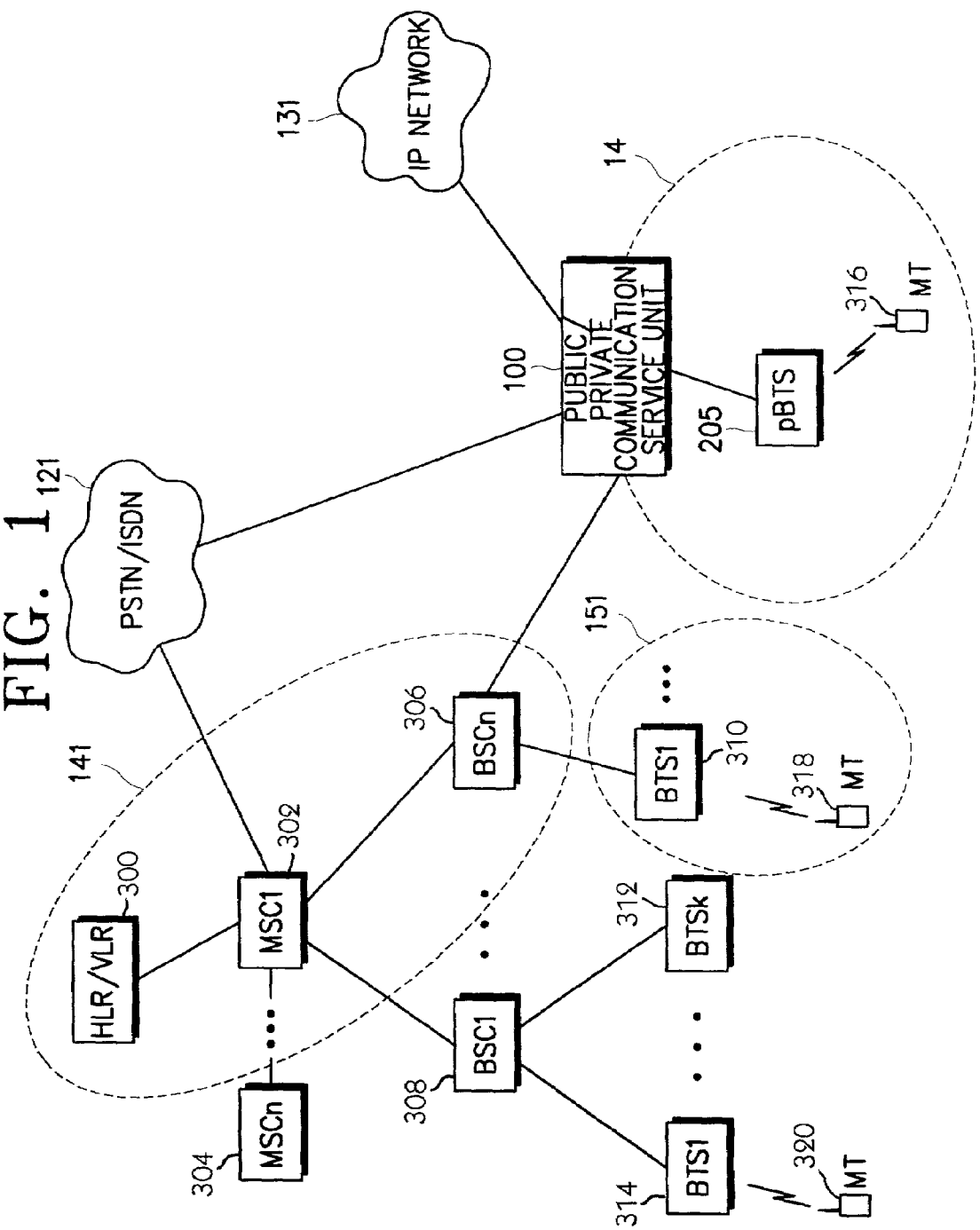
FIG. 1 is diagram illustrating a network structure for providing various communication services using wire/wireless and Internet protocol (IP) terminals according to an embodiment of the present invention.

FIG. 1 illustrates a network structure for providing various communication services using wire/wireless and IP terminals according to an embodiment of the present invention. The network structure is comprised of a public land mobile network (PLMN) 141 including mobile switching center (MSC) 302, base station controller (BSC) 306, and home location register/visitor location register (HLR/VLR) 300 for controlling the wireless communication service, and a public-only cell 151 including base transceiver subsystem (BTS) 310 for servicing a mobile subscriber of the PLMN 141 using mobile terminal (MT) 318. Further, the network structure includes a PSTN/ISDN 121 for providing wire voice and data communication services, and a public/private common cell 14, connected to the PLMN 141 and the PSTN/ISDN 121, for providing a wire/wireless unified communication service for both the public and private uses. The public/private common cell 14 includes a public/private communication service unit 100. The public/private common cell 14 defines a particular public/private common communication service area. For example, when a certain company uses (or occupies) one building, an area belonging to the building can be defined as the public/private common cell 14. The public/private common cell 14 is defined by mutual agreement with a public mobile communication service provider. A private BTS (pBTS) 205 in the public/ private common cell 14 corresponds to the base transceiver subsystem (BTS) from the viewpoint of the PLMN 141. Further, since the public/private communication service unit 100 includes a function of the mobile switching center (MSC) in the PLMN 141, it can provide a communication service between wireless (or mobile) terminals MT1 330 and MTn 332 of the registered service provider in the service area of the public/private common cell 14, as indicated by a dot-dash line (1) shown in FIG. 2. That is, in an exemplary embodiment of the present invention, the public/private communication service unit 100, which serves as a mobile switching center (MSC), is connected to the existing PLMN 141. In this case, the PLMN 141 recognizes the public/private communication service unit 100 as a base station. By doing so, when the registered mobile terminals MT1 330 and MTn 332 make an in-building (or extension) call, a call manager 109 allows the users of the mobile terminals MT1 330 and MTn 332 to use them as an extension telephone set (or interphone).

Otherwise, when an unregistered mobile terminal MT makes an in-building call, the public/private communication service unit 100 bypasses the call. A call made by a registered mobile terminal MT can be classified into one call made to a wire extension terminal and another call made to a wireless extension terminal. When making a call to the wire extension terminal, a call message is sent to a controller of the public/private communication service unit 100 through a LAN, so that the controller connects a time switch to allow a call to the corresponding terminal, when it is desired to make a call at a certain phone number.

The unregistered mobile terminal is a terminal that is not registered with the in-building system. In case the unregistered mobile terminal requests a call in-building, the in-building system connects the call to a public switched telephone network.

The wire extension terminal can be a wire phone, a LAN phone, or a web phone in building. The wire extension phone can correspond to either item 105 or item 111 in FIGS. 3 and 4, for example.

Since the public/private common cell 14 is formed as a one cell for both the wire/wireless unified in-building communication service and the PLMN 141, the radio wave of the existing PLMN reaches even the building. Therefore, a method for distinguishing the radio wave is required. To this end, a repeater is installed in each floor or a proper place of the building so that the extension (or in-building) mobile terminal MT can acquire the in-building base station. In this case, the pilot strength is controlled to be higher in the building. Therefore, the extension mobile terminal can communicate, free of charge, with other mobile terminals in the PLMN or the building using the private MSC, private BSC and private BTS functions provided by the public/private communication service unit 100.

When the mobile terminal moves out of a predefined coverage of the public/private common cell 14 during a call to another extension mobile terminal, the conventional CT-2 phone is not handed-off, whereas the novel mobile terminal of the present invention is handed-off to prevent the user from being charged for the call. In addition, the public/private communication service unit 100 provides a communication service to the PSTN/ISDN 121 and the IP network 131, and also provides a communication service to an internal voice terminal or an IP terminal. Further, when the user of the designated voice terminal or the IP terminal is absent, the public/private communication service unit 100 can communicate with a designated mobile terminal MT through the pBTS 205.

Figure 2:
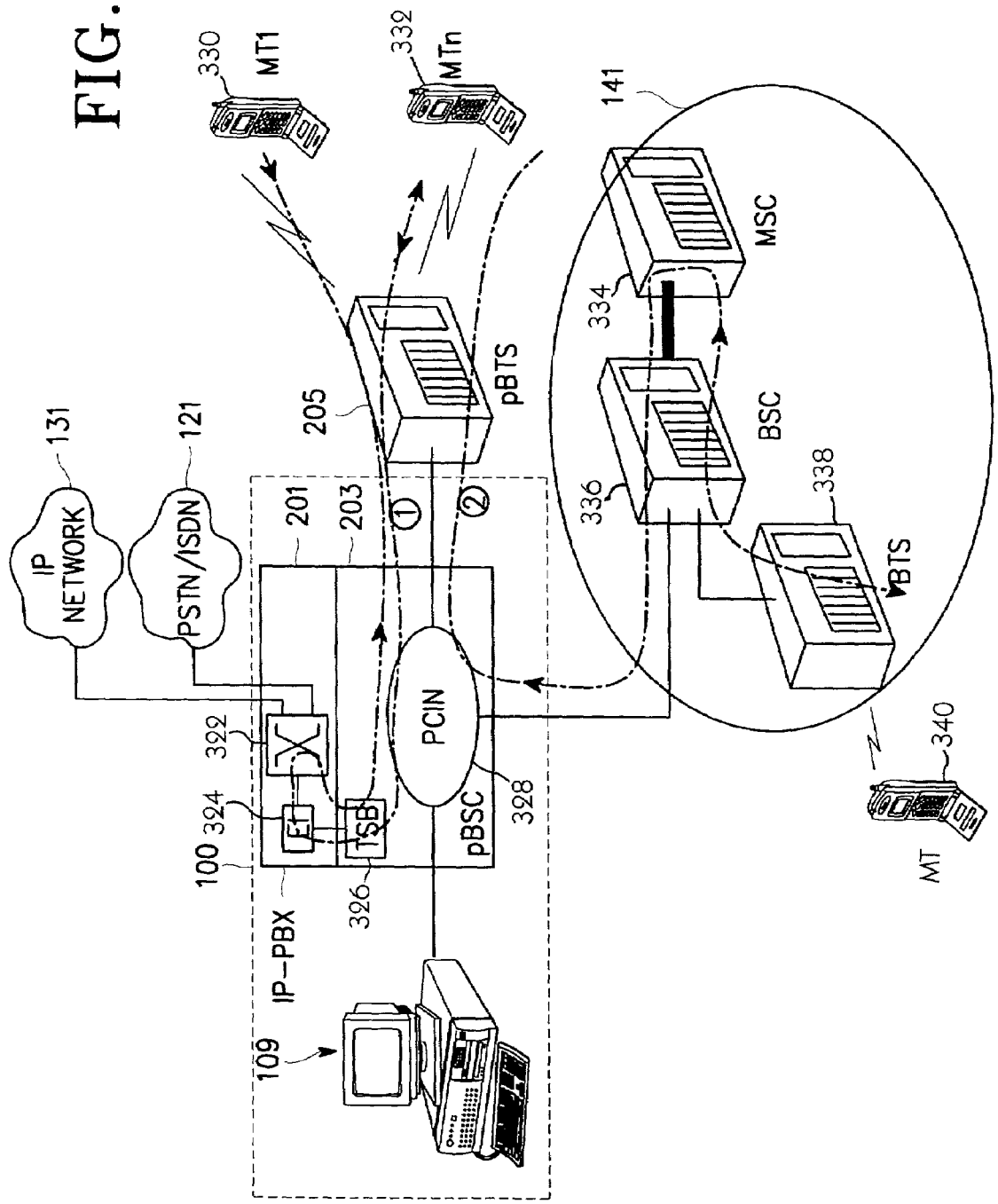
FIG. 2 is a diagram illustrating communication between wireless (or mobile) terminals in a public land mobile network (PLMN), or communication between a wireless local area network (LAN) and the PLMN and the connection between them according to an embodiment of the present invention.

Meanwhile, the mobile terminal MTn 332 in the public/private common cell 14 can also communicate with a mobile terminal MT 340 of the PLMN 141 as indicated by a dot-dash line (2) shown in FIG. 2, under the control of the public/private communication service unit 100 according to the present invention.

In FIG. 1, a public switched telephone network/integrated services digital network (PSTN/ISDN) 121 can communicate with a public land mobile network (PLMN) 141 and a public/private communication service unit 100. The PLMN 141 includes a HLR/VLR 300, an MSC1 302, and a BSCn 306. The MSC1 302 can communicate with MSCn 304, HLR/VLR 300, BSCn 306, and BSC1 308. In addition, the BSC1 308 can communicate with MSC1 302, BTS1 314, and BTSk 312. The BSCn 306 of PLMN 141 can communicate with public only cell 151. The public only cell 151 includes BTS1 310 and mobile terminal MT 318. The public/private common cell 14 includes pBTS 205 and mobile terminal MT 316.

In FIG. 2, the public/private communication service unit 100 includes private base station controller (PBSC) 201. The pBSC 201 includes switch 322, transcoder and selector bank (TSB) 326, E1 interface 324, and private communication interconnection network (PCIN) 328. As shown in FIG. 2, the PLMN 141 includes MSC 334, BSC 336, and BTS 338. The PLMN 141 can communicate with mobile terminal MT 340. The private base transceiver subsystem (pBTS) 205 can communicate with mobile terminals MT1 330 and MTn 332.

Figure 3:
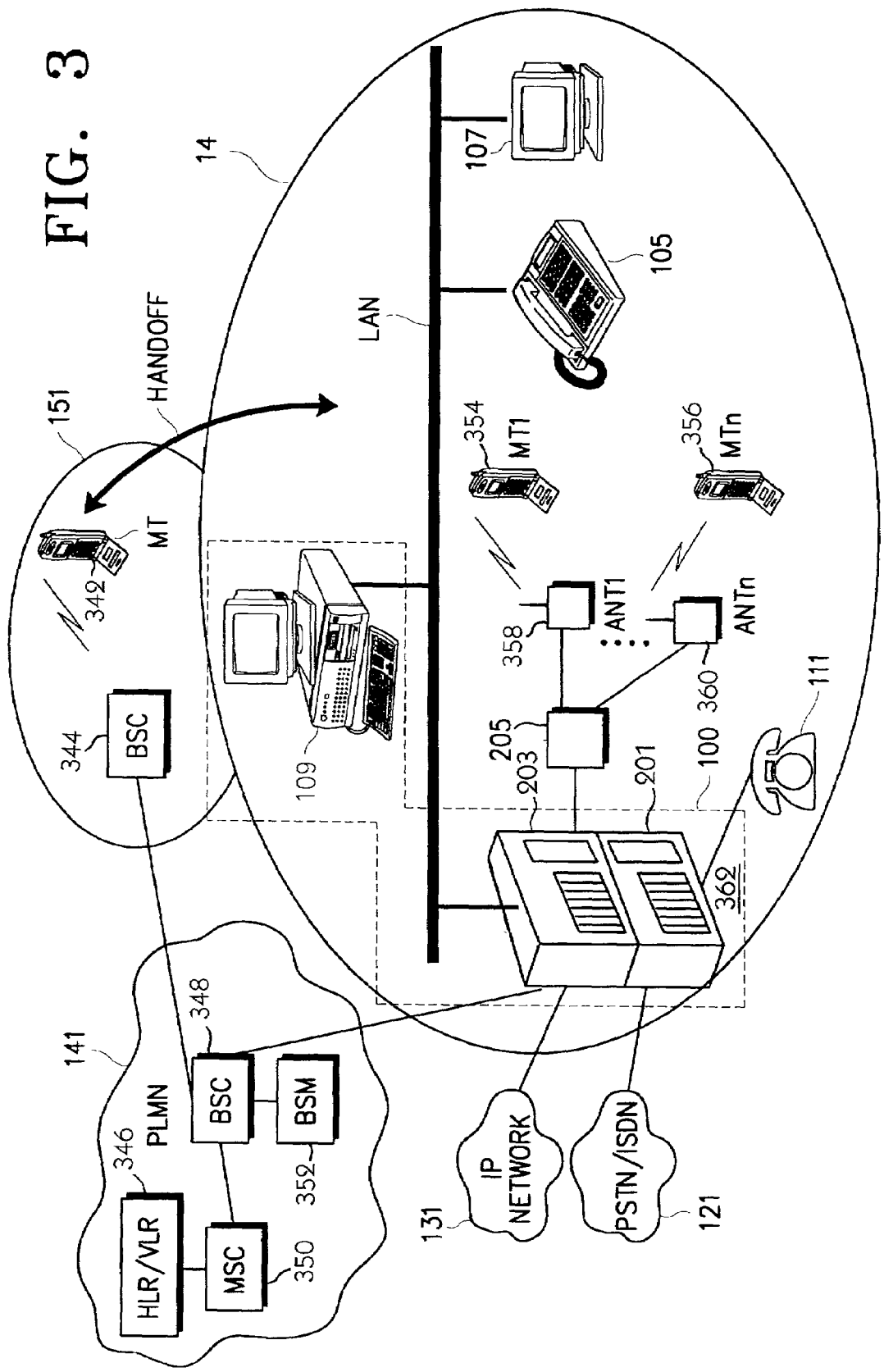
FIG. 3 is a diagram illustrating the connection among PLMN, public/private common cell, Internet protocol (IP) network, and public switched telephone network/integrated services digital network (PSTN/ISDN) according to an embodiment of the present invention.

FIG. 3 illustrates the connection among the PLMN 141, the public/private common cell 14, the public only cell 151, the public/private communication service unit 100, the IP network 131, and the PSTN/ISDN 121 according to an embodiment of the present invention.

Referring to FIG. 3, the public/private communication service unit 100 installed in a particular area of the building to provide a wire communication service is connected to the PSTN/ISDN 121, the IP network 131, and a wire telephone 111, to process an incoming/outgoing call from and to the office line (i.e., PSTN/ISDN, and private line) and an extension call (of wire, wireless and IP terminals), and service a call from the IP network 131 through the LAN using a LAN phone or web phone 105. Further, the public/private communication service unit 100 can exchange data from the IP network 131 and the PSTN/ISDN 121 with a personal computer (PC) 107.

In order to receive the wireless communication service according to the present invention, the mobile terminals MT1 354 to MTn 356 controlled by the public/private communication service unit 100 of the public/private common cell 14 should be registered in the communication service provider. Further, an area occupied by the public/private common cell 14 includes the private cell defined in the invention and the existing public cell. When it is assumed that the service area of the private cell according to the present invention is limited to a building, the private base transceiver subsystem (pBTS) 205 connected to the public/private communication service unit 100 has antennas ANT1 358 to ANTn 360 installed in each floor of the building through associated repeaters. Installing the repeaters in each floor is intended to increase strength of the pilot signal output from the in-building base station so as to enable the mobile terminals to easily acquire the in-building base station.

Therefore, even though the radio wave from the public cell is received, the mobile terminals can distinguish it and provide the service. That is, in the public/private common cell 14, the mobile terminal subscribed to a different communication service provider receives a service of a public cell of the existing different base station. Even for the mobile terminal of a subscriber to the same communication service provider, who desires to receive the service in the private cell according to the present invention, if it is not registered, the mobile terminal is controlled by the public/private communication service unit 100. However, it shares only the base station and is bypassed. When the mobile terminal is registered in the same communication service provider for the wireless in-building communication service according to the present invention, it receives the wireless in-building communication service under the control of the call manager 109 of the public/private communication service unit 100. The mobile terminals MT1 354 to MTn 356, under the control of the call manager 109 of the public/private communication service unit 100, can receive voice and data services through the LAN phone or web phone 105, a data service through the IP network 131 or the PSTN/ISDN 121, and a data service through the personal computer 107. The call manager 109 controls the public/private communication service unit 100 such that the public/private communication service unit 100 serves as the private MSC and the private BSC. Further, the call manager 109 is connected to the LAN cable to control the overall operation of the system, including management and maintenance of the resources, and registration and function setup of the wireless in-building subscribers.

In FIG. 3, the public/private communication service unit 100 includes call manager 109 and unit 362. Unit 362 includes pBSC 203 and IP-PBX 201. The units 201 and 203 are more clearly shown in FIG. 4. The PLMN 141 includes HLR/VLR 346, MSC 350, BSC 348, and base station manager (BSM) 352. The public only cell 151 includes mobile terminal MT 342 and BSC 344.

Figure 4:
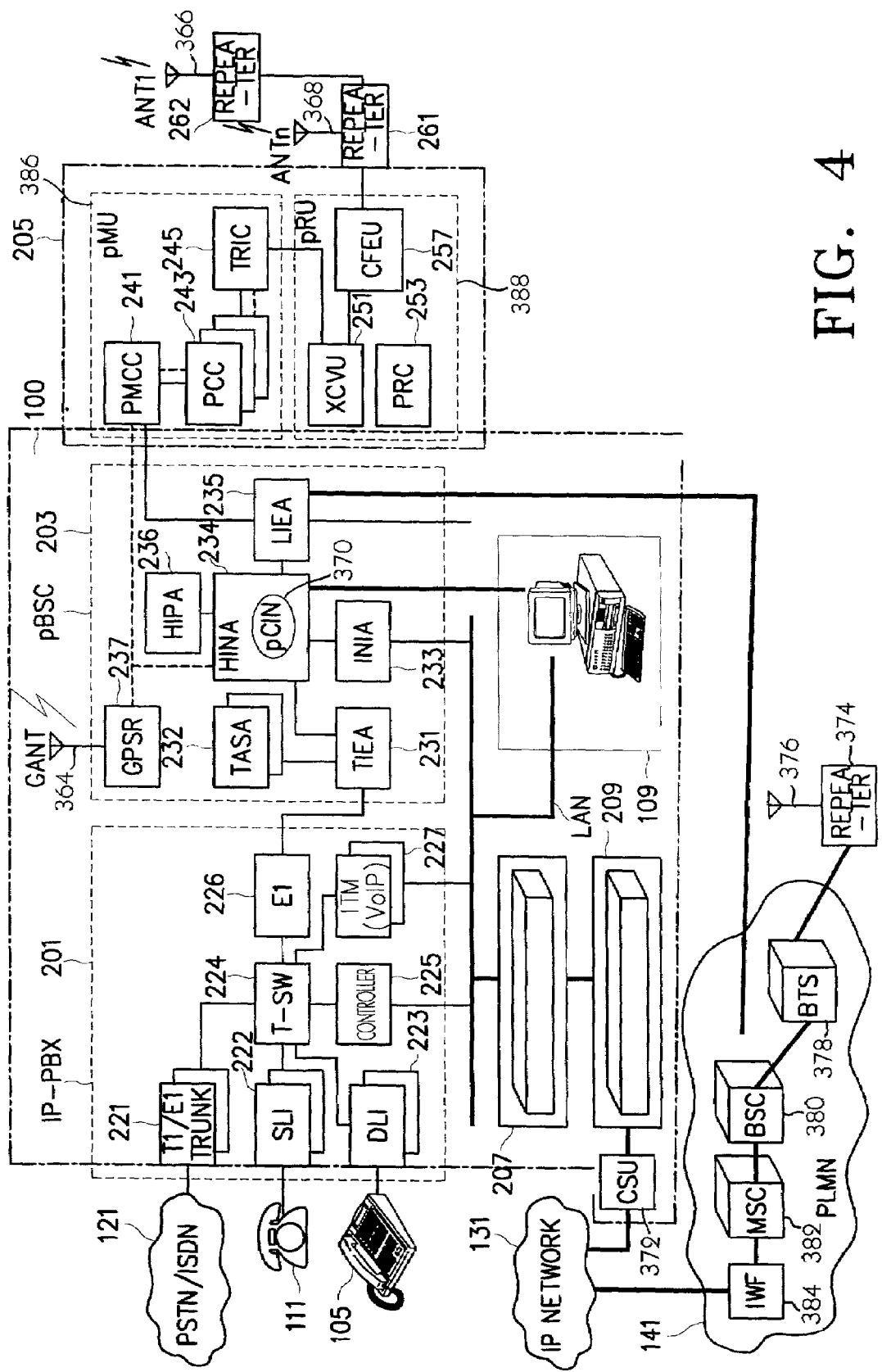
FIG. 4 is a detailed block diagram of the public/private communication service unit shown in FIG. 3, in accordance with the principles of the present invention.

FIG. 4 illustrates a detailed structure of the public/private communication service unit 100 shown in FIG. 3. Referring to FIG. 4, the public/private communication service unit 100 includes an Internet protocol-private branch exchange (IP-PB X) 201, a private base station controller (pBSC) 203, a private base transceiver subsystem (pBTS) 205, the call manager 109, a router 207, a local area network (LAN) switch 209, and the public land mobile network (PLMN) 141.

The IP-PBX 201 generates a switching control command signal according to an in-building PBX mobile switching call of the mobile terminals, which is set under the control of the call manager 109 connected to the LAN cable, and performs switching according to the generated switching control command signal. Further, the IP-PBX 201 enables an in-building (or extension) call and an incoming/outgoing call through the PSTN/ISDN 121, a subscriber line interface (SLI) 222 and a digital line interface (DLI) 223 connected respectively to a wire telephone 111 and a digital telephone 105 for the existing voice communication. In addition, the IP-PBX 201 manages data using maintenance and administration program (MAP), performs message communication on a call message using an information link message, and provides a service between Internet protocol (IP) terminals with the gateway and gate keeper function using a voice-over-Internet protocol (VoIP) by an ITU-T recommendation H.323 interface through the local area network (LAN) cable.

The term "MAP" is a software package of a personal computer for maintenance and administration of a system. A personal computer having the MAP is connected via a LAN in backplane of a PBX system, and then manages a database within the PBX system in online state.

The pBSC 203 connected to the IP-PBX 201 and a global positioning system (GPS) antenna (GANT) 364, provides a complete path to a mobile subscriber by allocating a vocoder in response to an outgoing call request originated from the mobile terminal, processes an incoming call by allocating a vocoder in response to an incoming call request, processes a test call at the operator's request, and processes a circuit mode data call for G3 facsimile modem and a packet mode data call for Internet service in addition to the voice call.

The private base transceiver subsystem (pBTS) 205 is connected to the pBSC 203 and divided into a main BTS unit (pMU) 386 and a radio BTS unit (pRU) 388. The pMU 386 performs a high-speed data service by the IS-95-B air I/F specification, various handoff power-up functions (PUF), closed-loop power control on a reverse link, priority access channel designation, call processing control on a service in association with a CDMA V.2 system, operation control for supporting the call processing control function, and maintenance, such as sate management, test and alert, of the CDMA V.2 system.

The "IS-95B" air interface specification is a service standard of an intermediate step in a process that an IMT-2000 service has developed through an IS-95C. In the present invention, the IS-95B air interface specification corresponds to the standard stipulated in the U.S. Telecommunications Industry Association (TIA).

The pRU 388 connected to the pMU 386, is connected to repeaters 261 and 262 with the antennas ANT1 366 to ANTn 368, performs up-conversion on a transmission signal and down-conversion on a receiving signal, and amplifies power of the transmission signal.

The call manager 109 controls the wireless call, performs operation and maintenance on the radio resource, performs PGM and program loaded data (PLD) loading function of a processor for controlling the pBSC 203 resource, controls the wire/wireless unified communication service, supports a wireless in-company short message service (SMS), performs visitor location register (VLR) management on a mobile terminal roaming function among a short message service (SMS) web server, the IP-PBX 201 and the pBSC 203, and performs registration and function setup on the in-building mobile subscribers.

The router 207 is connected to the IP network 131 through the E1 line and the channel service unit (CSU) 372. The router 207 transmits and receives data at a transfer rate which is a multiple of the T1 or E1-class rate, and accesses a wireless network with the pBSC 203 and an IP-based data network under the control of a telephone network of a circuit switching network with the IP-PBX 201 and the call manager 109.

The LAN switch 209 is connected to the IP-PBX 201, the pBSC 203, and the call manager 109 through the router 207. The LAN switch 209 performs a backbone function for switching data in the system and performs a backbone function for allowing the system users to connect with the LAN. The PLMN 141 includes the public MSC 382, BSC 380, BTS 378, and inter-working function (IWF) 384 connected to the IP network 131 and the pBSC 203.

The IP-PBX 201 is connected to the PSTN/ISDN 121 through a T1/E1 trunk 221. The wire telephone 111 is connected to the SLI 222, and the digital telephone 105 is connected to the DLI 223. A time switch (T-SW) 224 performs a switching operation under the control of a controller 225, to enable voice communication with the wire telephone 111 and the digital telephone 105, which are the wire terminals.

The controller 225 is connected to the LAN switch 209 and the call manager 109 through the LAN cable, and performs, when there exists a call for the registered in-building mobile terminal, a switching operation according to a switching control command, thereby performing the MSC function of the existing PLMN. Further, the controller 225 connects the time switch 224 to an Internet trunk module (ITM; or VoIP) 227 such that the wire terminals 111 and 105 interwork with the IP terminal by the time switch 224, thereby servicing the VoIP function. Therefore, the subject of the call becomes the wire, wireless and IP terminals, and call switching for the wire/wireless unified function is performed by the time switch 224 of the IP-PBX 201. The wire/wireless unified function is controlled by the call manager 109. Further, the time switch 224 in the IP-PBX 201 is connected to a transcoder and selector bank interface E1 assembly (TIEA) 231 of the pBSC 203 through an E1 connector 226.

The pBSC 203 constitutes a private code division multiple access (CDMA) internal connection network. The TIEA 231 in the pBSC 203 is connected to the E1 interface 226 in the IP-PBX 201, and a transcoder and selector bank assembly (TASA) 232. The TASA 232 has the vocoder function for interfacing a 2.048 Mbps non-multiple transmission channel. This is to accommodate 60 vocoders per transcoder and selector bank (TSB) during E1 interfacing, provide an address of a channel element to a vocoder allocated by the call manager 109 during call setup, and provide sign transition and registration information by the mobile terminal to the call manager 109 during the call processing procedure.

The TIEA 231 detects installation/uninstallation and an operating state of the TASA 232, and provides the corresponding information to the call manager 109. The TIEA 231 and the TASA 232 do not directly provide the entire state information to the call manager 109, but receive the state information through the LAN cable by processing the state information in a high capacity inter-process communication (IPC) node board assembly (HINA) 234 and an Internet protocol network interface assembly (INIA) 233.

The high capacity inter-process communication node board assembly (HINA) 234 receives a clock at a global positioning system clock receiver (GPSR) 237, and has a processor function, a node address downloading and failure management function and a node blocking and resetting function, while enabling high level data link control (HLDC) packet recognition and processing. The HINA 234 includes PCIN 370. Further, the HINA 234 has a maintenance (M) bus interfacing function for maintaining a high capacity inter-process communication processor assembly (HIPA) 236.

The high capacity inter-process communication processor assembly (HIPA) 236 provides an inter-process communication channel function for inter-processor communication, and provides maintenance-bus (M-bus) interfacing and data bus (D-bus) interfacing functions for blocking and resetting of a node, and maintenance of the node and link. The Internet protocol network interface assembly (INIA) 233 is connected to the LAN cable to interface with the LAN function, monitors installation/uninstallation and functional failure of the HINA 234 and the HIPA 236, and transmits the monitoring results to the call manager 109 using an Ethernet port. Further, the INIA 233 transmits the packet data received from the mobile terminal to the IP network 131 through the router 207 and the LAN switch 209. A local interface E1 assembly (LIEA) 235 is connected to the HINA 234. The LIEA 235 is connected to the pMU 386 of the pBTS 205 and the PLMN 141 in an E1 line mode, and transmits and receives the packet data in the unchannelized form. The LIEA 235 generates clock, data and alarm from the 2.048 Mbps pulse code modulation (PCM) data received from the other party's office, and assembles 1920 Kbps inter-process communication (IPC) data by removing the data required in interfacing with the E1 trunk. The LIEA 235 transmits the generated IPC data to the HINA 234 through a U-link and transmits to the other party's office the IPC data received from the HINA 234 through the U-link at a transfer rate of 2.048 Mbps. The LIEA 235 is connected to a pBTS main controller (PMCC) 241 in the pMU 386 of the pBTS 205.

The PMCC 241 in the pMU 386 processes call-setup and system performance-related signaling message, determines transmission power of a call attempted by the mobile station (or mobile terminal), performs management of the entire hardware and software configuration, assigns necessary resources, controls, monitors and manages the entire base station, performs internal packet routing, and interfaces with the pBSC 203.

The term "allocation" as used herein refers to allocation of a radio resource (i.e., frequency, CDMA frame offset, channel element, and code channel) and allocation of an overhead channel (i.e., pilot, synchronization, paging and access channels) to a channel card. The "internal packet routing" interfaces the packet data between the pBSC 203 and a pico BTS channel card (PCC) 243. The PCC 243 processes a channel allocated by the CDMA specification.

The CDMA specification can be described as follows. An international IMT-2000 technological standardization has mainly been developed into two categories, that is, firstly, based on a North America (CDMA-2000) system and secondly, based on an Europe/Japan (W-CDMA) system. in order to unify these two systems into one, the recent method has been under development based on 3GPP and 3GPP2, but a unified standardization is becoming actually difficult. So far, the technology standardization has been developed by an interest of manufacturing companies such as Ericsson, Lucent Technology, Motorola, and Nokia. However, in the IMT-2000 technology standardization, in order to reflect an opinion of worldwide mobile communication service enterprises, an Operator's Harmonization Group (OHG) was established in May 1999, which proposes a system for unifying a plural standard to ITU, 3GPP and 3GPP2 so as to reflect their requests and is associated with the enterprises networks to thereby obtain a self-regulating standard selection right. Also, TIA, ARIB, TTC and TTA were established in January 1999 in order to set a detailed standard, such as a $3^{rd}$ generation ANSI-41 network, CDMA-2000 and terminal etc., as 3GPP2 ($3^{rd}$ General Partnership Project 2).

The system according to the present invention can include a maximum of 4 PCC boards, and these serve as redundancy during sector operation so as to minimize an influence on the overall capacity even if one of the PCC boards is failed. For processing a baseband signal allocated by the radio specification, each PCC board includes 16 channel elements, and two control digital signal processors (CDSPs) manage 8 channels.

Each PCC 243 transmits pilot channel, sync channel, paging channel and forward traffic channel, performs interleaving, encoding, CDMA direct sequence spreading (DSS), baseband filtering and phase equalization on the forward traffic channel transmitted from the pBSC 203 according to the IS-95-A CAI specification, and performs CDMA demodulation and deinterleaving on the reverse traffic channel received from the mobile station. Further, the PCC 243 supports a polling function between sectors in order to increase its utilization efficiency. That is, the PCC 243 can be allocated to a certain sector through interfacing with the PMCC 241, and allocates the redundant channel element to the overhead channel under the control of the CDSP, when the overhead channel is failed. A transmit/receive interface card (TRIC) 245 is connected to the PCC 243. The TRIC 245 performs transmit/receive interfacing between the pRU 388 of the pBTS 205 and the PCC 243, performs digital conversion and analog processing on the CDMA baseband signal on a transmit/receive path, and provides a CDMA channel distribution matrix between the PCC 243 and the pRU 388 during sector operation.

The "IS-95-A" CAI (common air interface) specification is a U.S. cellular mobile telephone standard, which is known as "CDMA' in the U.S.

Further, the TRIC 245 monitors levels and balance of the I and Q signals on the transmission path of the pRU 388, and performs alarm, performance monitoring and fail reporting functions for the PMCC 241, when the monitoring result exceeds a predetermined range. Interfacing with the pRU 388 for the transmit/receive signal in the FA unit combines the I and Q baseband signals on the forward link, and down-converts the received intermediate frequency (IF) signal of 69.99 megahertz (MHz) to a baseband signal. An interfacing according to the transmission/reception of signal between a pMU and pRU in a BTS 205 is performed by TRIC 245 of pMU and XCVU 251 of pRU.

The present invention uses a CDMA method, and the CDMA method uses a QPSK modulated method in order to convert a baseband signal into a high frequency and converts a signal of I-axis and Q-axis into a high frequency having a phase difference of 90 between signals in I-axis and Q-axis by a same oscillator, and then synthesizes two signals. Herein, I-signal is an in-phase channel signal and Q-signal is a quadrature channel signal.

The "FA unit" refers to an RF block of a system, which is a device for performing a wireless connection via a forward link and a reverse link between a CDMA block and a wireless mobile station. The FA unit assigns a wireless resource and manages a state of a radio unit. In the present invention, pRU/pMU correspond to the FA unit.

During the interfacing, interfacing with the PCC 243 receives data input from PCC 243 and transmits data output from the PCC 243. Interfacing with the PMCC 241 connects with the PMCC 241 through RS-232 for alarm and failure reporting, monitors levels and balance of the mixed I and Q baseband signals, and reports occurrence of failure, when failure occurs. Interfacing with the pRU 388 duplexes a transmit CDMA I-signal and a main receive interface signal in one coaxial cable, and duplexes a transmit CDMA Q-signal and a diversity receive interface signal in one coaxial cable. RS-232 is an Electronic Industries Association (EIA) standard for asynchronous serial data communications between terminal devices and communications equipment.

The TRIC 245 in the pMU 386 is connected to a transceiver unit (XCVU) 251 in the pRU 388. The pRU 388 is comprised of the XCVU 251, a pico BTS remote unit controller (PRC) 253 and a cable front-end unit (CFEU) 257. The pRU 388 is connected to the repeaters 261 and 262 with antennas ANT1 366 to ANTn 368.

Now, the embodiment of the present invention will be described according to its functions. There are three main sections set forth below. First, "wireless in-building communications" is discussed, in accordance with the principles of the present invention. Second, "wireless in-building communication through public land mobile network (PLMN)" is discussed, in accordance with the principles of the present invention. Third, "communication using Internet protocol (IP) terminal" is discussed, in accordance with the principles of the present invention.

First, "wireless in-building communication" shall be discussed. A wireless in-building communication path is formed along the dot-dash line (1) of FIG. 2. When an incoming call from a mobile terminal, selected from among MT1 330~MTn 332, is received through the repeaters 261 and 262 of FIG. 4, the XCVU 251 receives the call through the CFEU 257. The XCVU 251 is comprised of a transmit/receive synthesizer for generating a local frequency required for an up-conversion block for up-converting the baseband I/Q signal to a desired frequency band signal and a down-conversion block for down-converting the CDMA signal transmitted from the mobile station. The signal passed through the XCVU 251 is applied to the TRIC 245, and the TRIC 245 performs digital conversion and analog processing on the CDMA baseband during the transmit and receive process between the pRU 388 and the PCC 243. The output of the TRIC 245 is applied to the PCC 243, and the PCC 243 serves as a transmitter for pilot channel #1, sync channel, paging channel and traffic channel in the forward link. Further, the PCC 243 serves as a receiver for access channel and traffic channel on the reverse link. The output of the PCC 243 is applied to the PMCC 241, and the PMCC 241 is connected to the LIEA 235 through the E1 trunk and provides both the signaling and voice data to the LIEA 235 using the unchannelized channel. This data is applied to the HINA 234 through the LIEA 235, and the output of the HINA 234 is provided to the call manager 109. The call manager 109 determines in the visitor location register (VLR) whether the mobile terminal MT1 330~MTn 332 is a registered mobile terminal or not. As stated above, the mobile terminal MT1 330~MTn 332 initiated the incoming call. When the mobile terminal MT1 330~MTn 332 is determined to be an unregistered mobile terminal, the MT1 330~MTn 332 is connected to the PLMN 141. When the mobile terminal MT1 330~MTn 332 is determined to be a registered mobile terminal, then MT1 330~MTn 332 performs an in-building extension call. Only a registered mobile terminal performs an in-building extension call. To perform the wireless in-building (extension) call, a switching function for connection is required, and a voice signal is encoded into pulse code modulation (PCM) signal by Qualcomm code-excited linear prediction (QCELP) and provided to the IP-PBX 201. In order to control the time switch 224, the call manager 109 transmits the signal to the controller 225 through the LAN cable, and the controller 225 connects the switch by controlling the time switch 224. Meanwhile, the voice is converted to pulse code modulation data through the TASA 232 connected to the TIEA 231, and the pulse code modulation data is converted by the E1 link of the TIEA 231 and provided to the E1 interface 226 in the IP-PBX 201. The global positioning system clock receiver (GPSR) 232 provides the clock to the pBSC 203 and the pBTS 205 using the data received from the satellite. After the switching, as in the incoming path, a call is performed with a different mobile terminal MT via an opposite path.

Second, "wireless in-building communication through public land mobile network (PLMN)" shall be discussed. A wireless in-building communication path is formed along the dot-dash line (2) of FIG. 2. If the call manager 109 determines that the mobile terminal MT1 330~MTn 332 is an unregistered mobile terminal, signals from that mobile terminal MT1 330~MTn 332 go to the PLMN 141 and pass through the public/private communication service unit 100 as shown in FIG. 2, and are transferred to public/private common cell 14. For the extension call, when the mobile terminal moves out of the public/private common cell 14, a call is dropped (or disconnected) generating an alarm tone. However, for the call made through the PLMN 141, when the mobile terminal moves out of the public/private common cell 14, a handoff occurs through the BSC 336 of the PLMN 141. An incoming call can be received through the PSTN 121 and the PLMN 141. When the incoming call is received through any one of the PSTN 121 and the PLMN 141, the wire and wireless telephones simultaneously generate a ring tone, and its flow is similar to that of the wireless extension call.

Third, "communication using Internet protocol (IP) terminal" is discussed. The Internet protocol (IP) terminal receives a communication service through the IP network 131 and the public/private communication service unit 100 under the control of the call manager 109. The IP terminal is connected to the LAN switch 209 included in the system and is connected to another terminal by the call manager 109 after analyzing the IP address. It is also possible to perform incoming and outgoing calls with the existing terminal. If it is desired to make a call to an IP phone in the different area through the wire telephone 111 or the digital phone 105, it is possible to make a call to a desired mobile terminal by the call manager 109 through the ITM 227 in the IP-PBX 201 and the LAN cable.

As described above, the present invention provides an in-building wireless communication service in a limited local area using a code division multiple access (CDMA) technique and provides various data communication services using the existing wire and IP terminals. Further, the invention provides an economic and reliable unified communication service by combining a CDMA system with voice-over-Internet protocol (VoIP) and gate keeper and commonly using a mobile switching center (MSC) for controlling wire and wireless in-building switching in a private branch exchange (PBX). In addition, the invention provides a wireless in-building communication service in a single-cell concept, thereby enabling the subscribers to use the service free of charge.

The foregoing paragraphs describe the details of a unified communication system, and in particular, a wire/wireless unified in-building communication method and system, which provides a call service through wire and wireless terminals by connecting a public land mobile network (PLMN) to a local area network (LAN) connected to a public switched telephone network (PSTN), and provides a data service through an Internet protocol (IP) terminal by connecting a local Internet protocol network to the local area network (LAN).

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A communication method in a wireless in-building communication system connected to a public land mobile network including a mobile switching center and a base station controller, said method comprising the steps of:

forming a common cell area in which a wireless public communication service and a wireless in-building communication service are available through a private base station;

requesting a communication service at a mobile terminal in the common cell area;

determining, in response to the requesting of the communication service, whether the mobile terminal is registered for the wireless in-building communication service;

providing the wireless in-building communication service to a registered mobile terminal; and bypassing the communication service request of an unregistered mobile terminal to the public land mobile network.

2. The method of claim 1, wherein the communication service includes voice and data services.

3. The method of claim 1, wherein signals from the registered mobile terminal are outputted to at least one antenna mounted in said common cell area, and said at least one antenna is coupled to the wireless in-building communication system.

4. The method of claim 1, wherein the registered mobile terminal communicates with one of a wire extension terminal and a wireless extension terminal, and the registered mobile terminal wirelessly performs a data service through an Internet protocol network.

5. The method of claim 1, wherein the wireless in-building communication service provided to the registered mobile terminal includes a communication service between the registered mobile terminal and a wire extension terminal.

6. The method of claim 1, wherein the wireless in-building communication service provided to the registered mobile terminal includes a communication service between the registered mobile terminal and a wireless extension terminal.

7. The method of claim 1, wherein the wireless in-building communication system is connected to an Internet protocol network through a local area network.

8. The method of claim 7, wherein the wireless in-building communication service provided to the registered mobile terminal includes a data communication service between the registered mobile terminal and the Internet protocol network.

9. A unified in-building communication apparatus connected to a public land mobile network, said apparatus comprising:

a private base station for forming a common cell area in which a public land mobile network service and an in-building wireless network service are available;

a call manager responsive to a communication service request from a mobile terminal in the common cell area for determining whether the mobile terminal is registered for the in-building wireless network service, and for controlling provision of a corresponding service according to a result of the determination; and a public/private communication service unit responsive to control by said call manager for providing the in-building wireless network service to a registered mobile terminal, and for bypassing the communication service request of an unregistered mobile terminal to the public land mobile network.

10. The apparatus of claim 9, wherein the public/private communication service unit comprises:

an Internet protocol-private branch exchange for performing switching for establishing communication between the mobile terminal in the common cell area and a wire extension terminal, and for providing a path between a wireless extension terminal and one of a public switched telephone network and an integrated service digital network; and a private base station controller for allocating a vocoder in response to a call request of the mobile terminal in the common cell area, and for providing a communication path to the mobile terminal in the common cell area.

11. The apparatus of claim 10, further comprising:

a router for providing access between the unified in-building communication apparatus and an Internet protocol network; and a local area network switch connected to the unified in-building communication apparatus through the router for switching data of the unified in-building communication apparatus, and for connecting the unified in-building communication apparatus to the Internet protocol network through a local area network.

12. The apparatus of claim 11, further comprising a transcoder and selector bank interface for providing an interface between the local area network switch and the private base station controller.

13. The apparatus of claim 12, wherein the private base station controller is connected to a private base station and to the public land mobile network through respective communication lines, and includes a local interface assembly for providing an interface therebetween.

14. The apparatus of claim 13, wherein the local interface assembly generates and outputs inter-process communication data from communication data which is received from the private base station and the public land mobile network, and outputs communication data from inter-process communication data which is transmitted to the private base station and the public land mobile network.

15. The apparatus of claim 14, further comprising a high capacity inter-process communication node board assembly connected to the local interface assembly, the transcoder and selector bank interface, and the call manger, respectively, for performing inter-process communication data processing between the local interface assembly, the transcoder and selector bank interface, and the call manager.

* * * * *